US012713234B2

(12) United States Patent
Sasi et al.

(10) Patent No.: US 12,713,234 B2
(45) Date of Patent: Aug. 18, 2026

(54) CREDENTIAL STORAGE AND SELECTION OF CREDENTIALS FOR NON-PUBLIC NETWORK

(71) Applicant: NEC Corporation, Minato-ku (JP)

(72) Inventors: Nivedya Parambath Sasi, Bengaluru, NC (US); Rohini Rajendran, Bengaluru (IN); Takahito Yoshizawa, Boom (BE); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 404 days.

(21) Appl. No.: 17/617,458

(22) PCT Filed: May 26, 2020

(86) PCT No.: PCT/JP2020/020690

§ 371 (c)(1),
(2) Date: Dec. 8, 2021

(87) PCT Pub. No.: WO2020/250664

PCT Pub. Date: Dec. 17, 2020

(65) Prior Publication Data

US 2022/0225093 A1 Jul. 14, 2022

(30) Foreign Application Priority Data

Jun. 13, 2019 (IN) ............................ 201941023422

(51) Int. Cl.

| | |
|---|---|
| ***H04W 12/06*** | (2021.01) |
| ***H04W 12/72*** | (2021.01) |
| ***H04W 88/02*** | (2009.01) |

(52) U.S. Cl.
CPC ........... *H04W 12/06* (2013.01); *H04W 12/72* (2021.01); *H04W 88/02* (2013.01)

(58) Field of Classification Search
CPC ..... H04W 12/06; H04W 12/45; H04W 12/72; H04W 60/005; H04W 8/183; H04W 84/045; H04W 84/105; H04W 88/02
See application file for complete search history.

(56) References Cited

U.S. PATENT DOCUMENTS

| | | | | |
|---|---|---|---|---|
| 2010/0197350 | A1 | 8/2010 | Jeung | |
| 2013/0331063 | A1 | 12/2013 | Cormier et al. | |
| 2015/0162941 | A1* | 6/2015 | Ghosh | H04W 52/0229 455/140 |
| 2015/0341825 | A1* | 11/2015 | Soriaga | H04M 7/0012 455/450 |
| 2016/0007312 | A1* | 1/2016 | Cherry | H04W 8/183 455/435.3 |
| 2019/0289466 | A1* | 9/2019 | Conant | H04W 12/06 |
| 2020/0245235 | A1* | 7/2020 | Chun | H04W 48/18 |

(Continued)

OTHER PUBLICATIONS

International Search Report for PCT Application No. PCT/JP2020/020690, mailed on Aug. 11, 2020.

(Continued)

*Primary Examiner* — Nguyen T Vo
(74) *Attorney, Agent, or Firm* — Sughrue Mion, PLLC

(57) ABSTRACT

This disclosure related to the aspects of 5G system that supports Public Land Mobile Network and Non-Pubic Network especially in the context of how the UE (110) can handle multiple subscriptions when connecting to a Non-Public Network.

10 Claims, 8 Drawing Sheets

(56) References Cited

U.S. PATENT DOCUMENTS

| | | | | |
|---|---|---|---|---|
| 2020/0389835 | A1* | 12/2020 | Talebi Fard | H04W 48/04 |
| 2021/0092707 | A1* | 3/2021 | Ryu | H04W 84/045 |
| 2021/0099867 | A1* | 4/2021 | Brown | H04W 12/72 |
| 2022/0053581 | A1* | 2/2022 | Tsuda | H04W 76/11 |
| 2022/0060883 | A1* | 2/2022 | Zhu | H04W 8/245 |
| 2022/0078698 | A1* | 3/2022 | Geng | H04W 48/06 |
| 2022/0159460 | A1* | 5/2022 | Ben Henda | H04W 12/084 |
| 2022/0201593 | A1* | 6/2022 | Baek | H04W 4/50 |
| 2022/0312368 | A1* | 9/2022 | Zhang | H04W 12/068 |

OTHER PUBLICATIONS

3GPP TR 21.905, "Vocabulary for 3GPP Specifications", V15.0.0 (Mar. 2018), pp. 1-66.

3GPP TS 33.501, "Security architecture and procedures for 5G system", V15.2.0 (Sep. 2018), pp. 1-176.

3GPP TS 22.261, "Service requirements for the 5G system", V16. 5.0 (Sep. 2018). pp. 1-67.

3GPP TR 23.734, "Study on 6GS Enhanced support of Vertical and LAN Services". V1.0.0 (Dec. 2018), pp. 1-106.

3GPP TS 33.401, "3GPP System Architecture Evolution (SAE), Security architecture", V15.7.0 (Mar. 2019), Rel-15, pp. 1-163.

3GPP TR 33.897, "Study on Isolated Evolved Universal Terrestrial Radio Access Network (E-UTRAN) operation for public safety". V13.1.0 (Mar. 2016), Rel-13, pp. 1-24.

3GPP TS 31.102, "Characteristics of the Universal Subscriber Identity Module (USIM) application", V15.5.0 (Mar. 2019), Ref-15. pp. 1-311.

3GPP TS 31.101, "UICC-terminal interface; Physical and Logical characteristics", V15.1.0 (Oct. 2018), Rel-15, pp. 1-36.

3GPP TR 33.819, "Study on security for SGS enhanced support of vertical and LAN services", V0.3.0 (Mar. 2019), Rel-16, pp. 1-25.

3GPP TS 23.501, "System Architecture for the SG System", V16. 0.2 (Apr. 2019), Rel-16, pp. 1-316.

RFC 7542, "The Network Access Identifier" (May 2015), pp. 1-30.

3GPP TS 23.003, "Numbering, Addressing and Identification", V15.6.0 (Dec. 2018), Rel-15, pp. 1-130.

3GPP TS 23.401, "General Packet Radio Service (GPRS) enhancements for Evolved Universal Terrestrial Radio Access Network (E-UTRAN) access", V16.2.0 (Mar. 2019), Rel-16, pp. 1-418.

Interdigital, Adding support for SNPNs (Stand-alone Non-Public Networks), new cause codes, 3GPP TSG-CT WG1 Meeting #117 C1-193459, Apr. 17, 2019, pp. 1-31.

Extended European Search Report for EP Application No. EP20823067.2 dated on Jul. 6, 2022.

3rd Generation Partnership Project; Technical Specification Group Services and System Aspects; Study on Isolated Evolved Universal Terrestrial Radio Access Network (E-UTRAN) Operation for Public Safety; Security aspects (Release 13), 3GPP TR 33.897 V1.0.0, Sep. 10, 2015.

JP Office Action for JP Application No. 2021-572688, mailed on Oct. 25, 2022 with English Translation.

3GPP TR 23.734 V16.2.0, "3rd Generation Partnership Project; Technical Specification Group Services and System Aspects; Study on enhancement of 5G System (5GS) for vertical and Local Area Network (LAN) services (Release 16)", Jun. 11, 2019.

* cited by examiner

CREDENTIAL STORAGE AND SELECTION OF CREDENTIALS FOR NON-PUBLIC NETWORK

This application is a National Stage Entry of PCT/JP2020/020690 filed on May 26, 2020, which claims priority from Indian Patent Application number 201941023422 filed on Jun. 13, 2019, the contents of all of which are incorporated herein by reference, in their entirety.

TECHNICAL FIELD

This disclosure is related to the credential storage and selection of credentials for Non-Public Network.

BACKGROUND ART

The 5G system supports non-public networks (NPNs) which can be both physical and virtual non-public network. Various deployment possibilities as specified by 3GPP TS 22.261 (NPL 3) states that, "Specifically, they may be deployed as completely standalone networks, they may be hosted by a PLMN, or they may be offered as a slice of a PLMN". The 3GPP SA2 study has been completed and in a number of the solutions, it is assumed that a UE can hold subscription related data to multiple NPNs. In 3GPP SA3, it is defined that subscription identifiers are always stored on the USIM. Whereas this might not be strictly necessary for NPNs. It is likely that the standardized part of NPN is going to use USIMs (or may be embedded SIM-eUICC) for credential storage if the NPN service is provided by the PLMN that issued the USIM. A UE is defined as a ME with a USIM, where the USIM contains the credentials for one subscription. With NPN, the presence of multiple subscriptions on one UE is a new aspect that needs to be addressed.

Therefore, this disclosure relates to how the UE can handle multiple subscriptions when connecting to NPN. Each subscription related data may be stored in each USIM or eUSIM and the ME can interwork with multiple USIMs as known as multi-SIM UE device. The multiple subscription related data may be stored in a USIM or eUSIM.

CITATION LIST

Non Patent Literature

NPL 1: 3GPP TR 21.905, "Vocabulary for 3GPP Specifications", V15.0.0 (2018-03)

NPL 2: 3GPP TS 33.501, "Security architecture and procedures for 5G system", V15.2.0 (2018-09)

NPL 3: 3GPP TS 22.261, "Service requirements for the 5G system", V16.5.0 (2018-09)

NPL 4: 3GPP TR 23.734, "Study on 5GS Enhanced support of Vertical and LAN Services", V1.0.0 (2018-12)

NPL 5: 3GPP TS 33.401, "3GPP System Architecture Evolution (SAE); Security architecture", V15.7.0 (2019-03), Rel-15

NPL 6: 3GPP TR 33.897, "Study on isolated Evolved Universal Terrestrial Radio Access Network (E-UTRAN) operation for public safety", V13.1.0 (2016-03), Rel-13

NPL 7: 3GPP TS 31.102, "Characteristics of the Universal Subscriber Identity Module (USIM) application", V15.5.0 (2019-03), Rel-15

NPL 8: 3GPP TS 31.101, "UICC-terminal interface; Physical and Logical characteristics", V15.1.0 (2018-10), Rel-15

NPL 9: 3GPP TR 33.819, "Study on security enhancement of 5GS for vertical and LAN services", V0.3.0 (2019-03), Rel-16

NPL 10: 3GPP TS 23.501, "System Architecture of 5G System", V16.0.2 (2019-04), Rel-16

NPL 11: RFC 7542, "The Network Access Identifier" (2015-05)

NPL 12: 3GPP TS 23.003, "Numbering, Addressing and Identification", V15.6.0 (2018-12), Rel-15

NPL 13: 3GPP TS 23.401, "General Packet Radio Service (GPRS) enhancements for Evolved Universal Terrestrial Radio Access Network (E-UTRAN) access", V16.2.0 (2019-03), Rel-16

SUMMARY OF INVENTION

Technical Problem

Main Problem Statement:

Credential Storage:

The credential storage of a UE is placed in the USIM or eUSIM which securely stores the subscription credentials of the UE.

With NPN, the number of subscriptions can be larger than one for a UE and can include operator subscriptions and specific NPN subscriptions.

At any single moment in time, however, only one USIM or eUSIM may be active and the UE would need to switch USIMs if it would like to use credentials for different NPN subscriptions.

Switching of Credential Storage:

In the related art, there exists a security mechanism for IOPS (Isolated Operations for Public Safety) where the UE can switch the active credential storages or USIMs. This mechanism, however, only works for two USIMs and not for more. In this mechanism the PLMN ID is used to switch USIMs which won't work for NPN because one or more NPN can share the same PLMN ID if, for example, the NPN(s) is/are provided by the PLMN. A UE that has multiple NPN subscriptions therefore needs to be able to switch between the NPN subscriptions.

In addition, according to the 3GPP TS 23.501 (NPL 10) the UE can listen to Network identifier (NID) information in Broadcast system information that NG-RAN broadcasts and decides which NPN subscription to select. But there is no clear ME mechanism defined in the standard.

Sub-Problem Statement 1:

How can the UE select the correct credential set or USIM (or eUSIM) for authentication to an NPN given the fact that multiple NPNs may have same PLMN ID and that the UE can be connected to multiple NPNs at the same time.

Sub-Problem Statement 2:

If there are multiple subscription related data for a UE, how the UE responds if the call events on these subscription occurs simultaneously:

There should be an appropriate differentiation between the multiple subscriptions provided by the UE i.e., if the UE has USIM-1 subscription and USIM-2 subscription, the corresponding response should be received for the subscription for which the request is sent.

This problem applies for the case where the UE is attached to a network and attached to a slice with a specific service. Suppose that the slice is for NPN, the events on both networks should be taken care of.

Sub-Problem Statement 3:

Multiple NPN Subscription Credential Storage

- If there are multiple subscription for a UE when connecting to the Non-public network, the credentials, a NID associated to the Non-public network and other subscription related data should be stored somewhere in the network. It is unclear whether the UDM is the appropriate storage location.
- If the credentials, a NID associated to the Non-public network and other subscription related data are stored elsewhere in the network, the question is how these information are retrieved and by which element in the network.

In all of the above, credentials usually means the combination of a long term identifier with a long term key. For example, an IMSI and secret key together are called a credential. Similarly, a certificate, which consists of a public key and an identifier can also be a credential. Other examples of credentials include username and password, QR-codes, shared secret keys, public keys, home network public key, NPN network public key, etc. Also, in some cases, group credentials can be used where the credential is shared with multiple devices and may refer to the group, rather than the individual device that performs the authentication.

All these types of credentials can be stored in the ME or on the UICC. If they are stored on the UICC or eUICC, the canonical storage is to use a USIM or eUSIM.

In view of the problems described above, the present disclosure aims to provide a solution to solve at least one of the various problems.

Solution to Problem

A User Equipment (UE) according to one disclosure comprises at least one processor, and at least one memory operatively coupled with the at least one processor. The at least one processor comprises a first Universal Subscriber Identity Module (USIM) application that is used to perform an authentication for a normal network operation, and a second USIM application that is used to perform an authentication for a Non-Public Network (NPN). The first USIM application contains a first set of security credentials stored in a first storage in a Universal Integrated Circuit Card (UICC), and the second USIM application contains a second set of security credentials stored in a second storage in the UICC.

A network system according to one disclosure comprises a User Equipment (UE) and a Core network. The UE comprises at least one processor, and at least one memory operatively coupled with the at least one processor. The at least one processor comprises a first Universal Subscriber Identity Module (USIM) application that is used to perform an authentication for a normal network operation, and a second USIM application that is used to perform an authentication for a Non-Public Network (NPN). The first USIM application contains a first set of security credentials stored in a first storage in a Universal Integrated Circuit Card (UICC), and the second USIM application contains a second set of security credentials stored in a second storage in the UICC.

A method for a User Equipment (UE) according to one disclosure comprises performing, by using a first Universal Subscriber Identity Module (USIM) application, an authentication for a normal network operation; and performing, by using a second USIM application, an authentication for a Non-Public Network (NPN). The first USIM application contains a first set of security credentials stored in a first storage in a Universal Integrated Circuit Card (UICC), and the second USIM application contains a second set of security credentials stored in a second storage in the UICC.

DESCRIPTION OF EMBODIMENTS

1. Abbreviations

Figure 1:
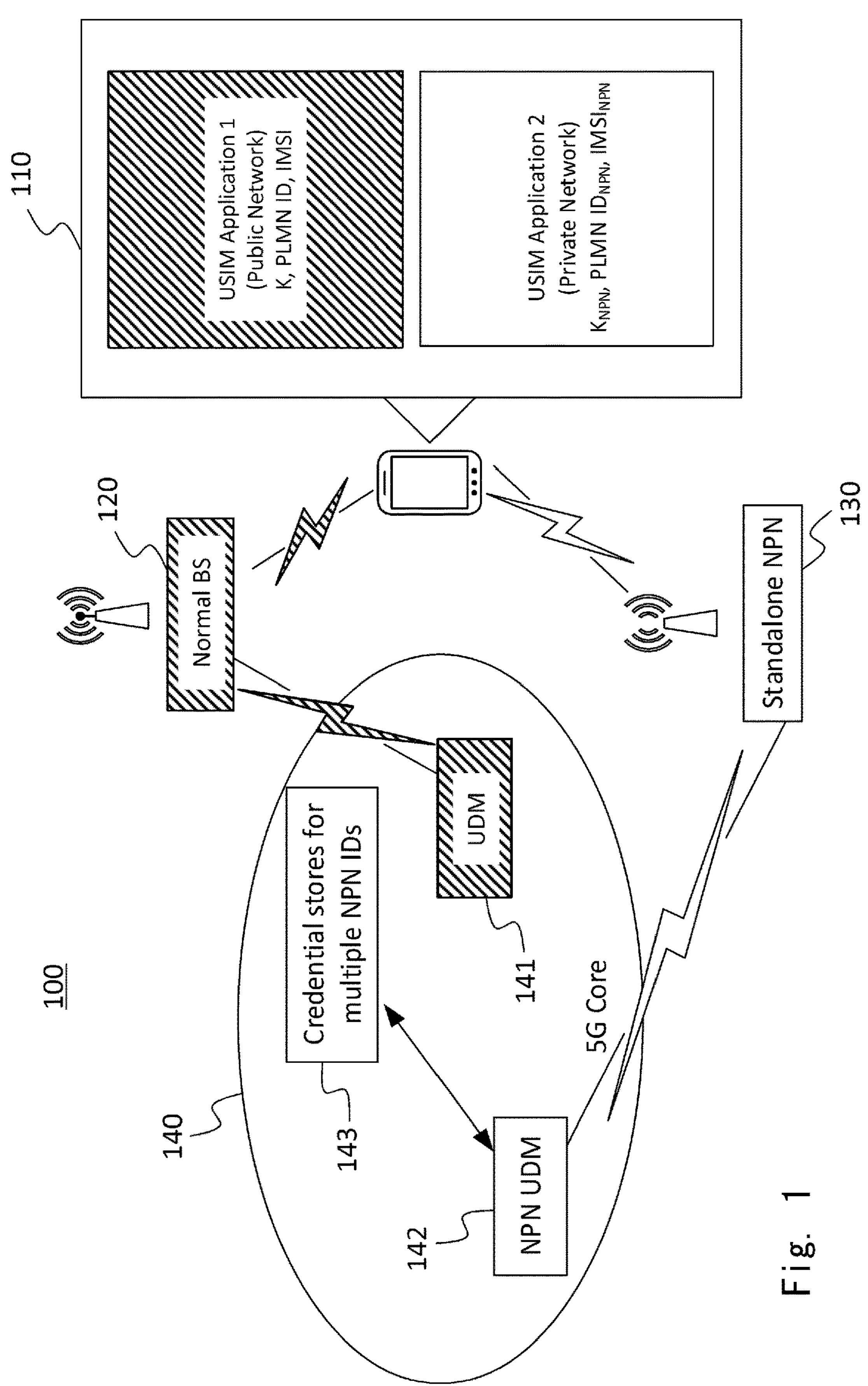
FIG. 1 illustrates an operation when a USIM application is activated according to a first aspect.

For the purposes of the present document, the abbreviations given in 3GPP TR 21.905 (NPL 1) and the following apply. An abbreviation defined in the present document takes precedence over the definition of the same abbreviation, if any, in

3GPP TR 21.905 (NPL 1).

5GC 5G Core Network
5GS 5G System
5G-AN 5G Access Network
5G-GUTI 5G Globally Unique Temporary Identifier
5G S-TMSI 5G S-Temporary Mobile Subscription Identifier
AMF Access and Mobility Management Function
AN Access Node
AID Application Identifier
AS Access Stratum
AUSF Authentication Server Function
CP Control Plane
CM Connection Management
CAG Closed Access Group
DL Downlink
DN Data Network
DNAI DN Access Identifier
DNN Data Network Name
EPS Evolved Packet System
EPC Evolved Packet Core
FQDN Fully Qualified Domain Name
GPSI Generic Public Subscription Identifier
GUAMI Globally Unique AMF Identifier
HR Home Routed (roaming)
IMSI International Mobile Subscription Identity
IOPS Isolated EUTRAN Operation for Public Safety
I-RNTI I-Radio Network Temporary Identifier
KDF Key Derivation Function
LADN Local Area Data Network
LBO Local Break Out (roaming)
LMF Location Management Function LRF Location Retrieval Function
MAC Medium Access Control
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NID Network identifier
NPN Non-Public Network
NPN ID Non-Public Network Identifier.

Note that NPN ID in this disclosure is equal to the NID in TS 23.501 (NPL 10).

NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PLMN Public Land Mobile Network
PSA PDU Session Anchor
QFI QoS Flow Identifier
QoE Quality of Experience
(R)AN (Radio) Access Network
RRC Radio Resource Control
SA NR Standalone New Radio
SBA Service Based Architecture
SBI Service Based Interface
SD Slice Differentiator
SEAF Security Anchor Functionality
SIB System Information Broadcast
SIDF Subscription Identifier De-concealing Function
SMF Session Management Function
S-NSSAI Single Network Slice Selection Assistance Information
SP Service Provider
SSC Session and Service Continuity
SST Slice/Service Type
SUCI Subscription Concealed Identifier
SUPI Subscription Permanent Identifier
UICC Universal Integrated Circuit Card
USIM User Subscriber Identity Module
UDSF Unstructured Data Storage Function
UDM Unified Data Management
UPF User Plane Function
UDR Unified Data Repository
URSP UE Route Selection Policy

2. Definitions

For the purposes of the present document, the terms and definitions given in TR 21.905 (NPL 1) and the following apply. A term defined in the present document takes precedence over the definition of the same term, if any, in TR 21.905 (NPL 1).

3. Information on Related Art

Related art from TS 23.501 (NPL 10)—"System architecture for the 5G":

Support for non-public networks—A Non-Public Network (NPN) is a 5GS deployed for non-public use, see TS 22.261 (NPL 3). An NPN may be deployed as:

A Stand-alone Non-Public Network (SNPN), i.e. operated by an NPN operator and not relying on network functions provided by a PLMN, or A Public network integrated NPN, i.e. a non-public network deployed with the support of a PLMN.

Public network integrated NPNs can be enabled using network slicing (as defined in Annex D of TS 23.501 (NPL 10)). To prevent unauthorized UEs from trying to access a Public network integrated NPN, the Closed Access Group (CAG) functionality can be used in addition.

Identifiers for Stand-alone non-public networks

The combination of a PLMN ID and Network identifier (NID) identifies an SNPN.

The PLMN ID used for SNPNs is not required to be unique. PLMN IDs reserved for use by private networks can be used for non-public networks, e.g. based on mobile country code (MCC) 999 as assigned by ITU.

The Network Identifier (NID) shall support two assignment models:

Locally managed NIDs are assumed to be chosen individually by SNPNs at deployment time (and may therefore not be unique)

Universally managed NIDs are assumed to be globally unique.

An optional human-readable network name helps to identify an SNPN during manual SNPN selection.

Support from Broadcast system information

NG-RAN nodes which provide access to SNPNs broadcast the following information:

One or multiple PLMN IDs

List of NIDs per PLMN ID identifying the non-public networks NG-RAN provides access to Optionally a human-readable network name per NID.

UE configuration and subscription aspects for SNPN

An SNPN-enabled UE is configured with subscriber identifiers and credentials for one or multiple SNPNs identified by the combination of PLMN ID and NID.

A subscriber of an SNPN is identified by a SUPI containing a network-specific identifier that takes the form of a Network Access Identifier (NAI) using the NAI RFC 7542 (NPL 11) based user identification as defined in TS 23.003 (NPL 12) clause 28.2.2. The realm part of the NAI may include the NID of the SNPN.

An SNPN-enabled UE supports the SNPN access mode. When the UE is set to operate in SNPN access mode the UE only selects and registers with SNPNs over Uu.

If a UE is not set to operate in SNPN access mode, even if it is SNPN-enabled, the UE does not select and register with SNPNs.

Network selection in SNPN access mode

UEs operating in SNPN access mode read the available PLMN IDs and list of available NIDs from the broadcast system information and take them into account during network selection.

For automatic network selection, the UE selects and attempts to register with the available SNPN identified by a PLMN ID and NID for which the UE has SUPI and credentials. If multiple SNPNs are available that the UE has SUPI and credentials for, then the priority order for selecting and attempting to register with SNPNs is based on UE implementation.

For manual network selection UEs operating in SNPN access mode provide to the user the list of NIDs and related human-readable names (if available) of the available SNPNs the UE has SUPI and credentials for.

When a UE performs Initial Registration to an SNPN, the UE shall indicate the selected NID and the corresponding PLMN ID to NG-RAN. NG-RAN shall inform the AMF of the selected PLMN ID and NID.

Network access control

If a UE performs the registration or service request procedure in an SNPN identified by a PLMN ID and a locally managed NID and there is no subscription for the UE, then the AMF shall reject the UE with an appropriate cause code to temporarily prevent the UE from automatically selecting and registering with the same SNPN.

If a UE performs the registration or service request procedure in an SNPN identified by a PLMN ID and a universally managed NID and there is no subscription for the UE, then the AMF shall reject the UE with an appropriate cause code to permanently prevent the UE from automatically selecting and registering with the same SNPN.

In order to prevent access to SNPNs for authorized UE(s) in case of network congestion/overload, unified access control information is configured per non-public network (i.e. as part of the subscription information that the UE has for a given non-public network).

Cell (re-)selection in SNPN access mode

UEs operating in SNPN access mode only select cells and networks broadcasting both PLMN ID and NID of the selected SNPN.

Access to PLMN services via stand-alone non-public networks

To access PLMN services, a UE in SNPN access mode that has successfully registered with an SNPN may perform another registration via the SNPN with a PLMN (using the credentials of that PLMN) following the same architectural principles as specified in clause 4.2.8 of TS 23.501 (NPL 10) and the SNPN taking the role of "Untrusted non-3GPP access".

Access to stand-alone non-public network services via PLMN

To access SNPN services, a UE that has successfully registered with a PLMN may perform another registration via the PLMN with an SNPN (using the credentials of that SNPN) following the same architectural principles as specified in clause 4.2.8 of TS 23.501 (NPL 10) and the PLMN taking the role of "Untrusted non-3GPP access".

Public network integrated NPN

Public network integrated NPNs are NPNs made available via PLMNs e.g. by means of dedicated DNNs, or by one (or more) Network Slice instances allocated for the NPN. The existing network slicing functionalities apply as described in clause 5.15 of TS 23.501 (NPL 10). When an NPN is made available via a PLMN, then the UE has a subscription for the PLMN.

Annex D of TS 23.501 (NPL 10) provides additional consideration to consider when supporting Non-Public Network as a Network Slice of a PLMN.

As network slicing does not enable the possibility to prevent UEs from trying to access the network in areas which the UE is not allowed to use the Network Slice allocated for the NPN, Closed Access Groups may optionally be used in addition to network slicing to apply access control.

A Closed Access Group identifies a group of subscribers who are permitted to access one or more CAG cells associated to the CAG.

CAG is used for the Public network integrated NPNs to prevent UE(s), which are not allowed to access the NPN via the associated cell(s), from automatically selecting and accessing the associated cell (s).

The following is required for identification:

A CAG is identified by a CAG Identifier which is unique within the scope of a PLMN ID;

A CAG cell broadcasts one or multiple CAG Identifiers per PLMN;

Related art from TR 23.734 (NPL 4) for Study on 5GS Enhanced support of Vertical and LAN Services:

Solution #1: Identification, selection and access control for non-public networks states the following:

UE does cell selection based on PLMN ID and NPN ID.

UE shall only attempt to register with NPNs it has a subscription for and shall use a priority mechanism if multiple subscriptions and multiple networks are available.

Solution #2: Closed Access Group states the following:

The subscription shall contain a number of CAG IDs that the UE has access to.

Solution #3: Non-public network identification, selection and access control states the following:

Shows a scenario where multiple NPNs share one NPN ID. The subscription is identified by SP ID.

RAN broadcasts PLMN ID, NPN ID and SP ID.

Using Equivalent Home PLMN list to select SP-ID.

Solution #5: Solution for Access Control states about:

The need to identify the subscription so that access control can be enforced.

Says about the need to have a clear text element that describes how to identify the Non-Public Network subscription.

Related art from TS 33.401 (NPL 5):

Isolated E-UTRAN Operation for Public Safety (IOPS) provides the ability to maintain a level of communications for Public Safety users, via an IOPS-capable eNB (or set of connected IOPS-capable eNBs), following the loss of backhaul communications.

The Isolated E-UTRAN mode of operation is also applicable to the formation of a Nomadic EPS deployment, i.e. a deployment of one or more stand-alone IOPS-capable eNBs, creating a serving radio access network without backhaul communications and also providing local IP connectivity and services to Public Safety users in the absence of normal EPS infrastructure availability.

The Public Safety network operator dedicates a PLMN identity to IOPS mode of operation which is broadcasted in System Information by the eNB when IOPS mode is in operation. Only authorized IOPS-enabled UEs can access a PLMN indicated as an IOPS PLMN.

The security features and procedures described in this specification can be used to provide a security solution for an IOPS network based upon the Local EPC approach.

In order to ensure that support for IOPS does not compromise the security of normal operation, when operating in IOPS mode the AKA procedure (described in sub clause 6.1 of 3GPP TS 33.401 (NPL 5)) is performed between a USIM application dedicated exclusively for IOPS operation on a UICC, present in IOPS-enabled UEs, and the Local HSS (contained in the Local EPC). The same applies in the event of a loss of backhaul communications and a transition of the IOPS-capable eNB to support Isolated E-UTRAN operation for a population of IOPS-enabled UEs.

The USIM application dedicated exclusively for IOPS operation uses a distinct set of security credentials separate from those used for 'normal' operation. These credentials are configured in the Local HSS and in the UICC prior to the commencement of IOPS operation.

The USIM application dedicated exclusively for IOPS operation, in an IOPS-enabled UE, has a distinct set of security credentials which contains at least:

A permanent key K (uniquely assigned for IOPS operation).

The PLMN identity assigned for IOPS network operation.

An IMSI (uniquely assigned for IOPS operation).

Access Class status of 11 or 15 (subject to regional/national regulatory requirements and operator policy).

These credentials are provisioned in all Local HSSs within the Local EPCs supporting IOPS operation where the Public Safety authority requires that the UE be provided service in the event of a loss of backhaul communication.

Storage of the IOPS network security credential set in the Local HSS is only performed for UEs authorized for operation in the IOPS network. Administrative provisioning is used to keep up to date security credentials for all authorized UEs at the Local HSSs within the Local EPCs. Updates are provided within a security context that already exists between the EPC and eNBs in the 'normal' network.

This solution provides integrity and confidentiality for IOPS networks and maintains commonality with the procedures defined in this specification. Furthermore, the approach is aligned with the implementation and deployment guidelines for IOPS as defined in 3GPP TS 23.401 (NPL 13).

Related art from TR 33.819 (NPL 9):

Key Issue #2.3: Independent credentials for authentication and authorization with NPN and PLMN This key issue is related to support of credentials, for authentication and authorization when a UE needs to access and obtain services offered from a PLMN via a NPN and vice versa.

As per the concluded solution in 3GPP TR 23.734 (NPL 4), to access PLMN services via non-public network, UE obtains IP connectivity via the non-public network, discovers a N3IWF provided by PLMN, and establishes connectivity to the PLMN via the N3IWF. Similar procedure to be followed by UE vice versa, to access non-public network services via PLMN. PLMN and non-public networks are different networks that UE will be connected to simultaneously.

For PLMN networks, 5G AKA and EAP-AKA' are supported authentication methods. For Non-public networks (Private networks) using 5G system, supported authentication methods are 5G AKA, EAP-AKA' and additional methods within EAP framework 3GPP TS 33.501 (NPL 2). UE and Non-public network need to be in possession of the security credentials corresponding to the authentication method (over EAP framework) used for primary authentication, based on the NPN operator policy.

4. Proposed Aspects

4.1 First Aspect

A UE is defined as a ME with UICC which contains USIM application, where the USIM application contains the credentials for one subscription. With Non-Public Network the presence of more than one subscription in a UE is the new aspect that need to be addressed.

In this disclosure, it is proposed to have dedicated USIM (Universal Subscriber Identity Module) or NSIM (Non-Public Network Subscriber Identity Module) application for Non-Public Network Subscription. This means that the NPN credentials are managed and stored in a storage that is separate from the operator credentials. In some cases, no operator credential may be present, for example if the UE is only meant to connect to a private deployment and may never connect to a public deployment.

According to 3GPP TS 23.501 (NPL 10), the following information's are broadcasted in System Information Block by the gNB in order to provide access to the Non-Public Network:

One or multiple PLMN IDs consisting of MCC 999 (assigned by ITU for private networks) and an MNC defined by 3GPP to identify the network as part of a non-public network.

List of NIDs per PLMN ID identifying the Non-Public network that NG-RAN provides access to.

NPN Credential Storage in UE:

A UE can be subscribed to multiple NPNs. So it is necessary to store multiple NPN credentials in a UE. In this aspect it is also proposed to have an embedded UICC (eUICC) for storing NPN credentials. An embedded USIM (eUICC) can download and store multiple profiles. Each Profile comprising of the operator and subscriber data that would have otherwise been stored on a traditional USIM application in the UICC.

Network and USIM selection:

Based on the information received in the System information broadcasted by gNB the UE performs network selection between gNBs broadcasting the list of NPN-IDs per PLMN.

UE performs cell (re-)selection between gNBs broadcasting the same NPN-ID.

The UE activates the appropriate USIM/NSIM application when it has to connect to any particular Non-Public Network. UE will automatically select and attempt to register with a non-public network the UE has a subscriber identifier and credentials for. If there exists more than one NPN subscription i.e., UE is subscribed to access more than one Non-Public network, then the UE has to follow the priority order for selecting and attempting to register with non-public networks as mentioned in TS 23.501 (NPL 10), clause 5.30.2.4.

Since at no time a single IMSI can be connected to more than one secret key or algorithm, USIM/NSIM application dedicated for NPN may have dedicated IMSI for NPN (NPN ID), Long term key ($K_{NPN}$), PLMN ID it is associated to and one type of authentication algorithm it is connected to. The NPN credential storage may also store a public key related to the NPN ID so that the NPN ID may be encrypted with the public key. The public key, however, may also be stored on the ME.

In this aspect it is also proposed to add "Network Subscription Type" in SUCI. The Network Subscription Type denotes if the UE/User has the subscription for which Non-public network or to the PLMN network.

1. If the PLMN provides the NPN service in this case, the MNC may denote a PLMN network, but the subscription will be for the NPN hosted by the PLMN. MNC alone is not sufficient to indicate the UE's subscription type associated with a network.
2. If the UE has a single SUPI, for both PLMN and all NPNs it is subscribed, then it will lead to privacy issues as the NPNs may need know the UE's PLMN specific SUPI.

Also Network Subscription Type contains identification information about the various Non-Public Networks. Hence it can be used as a parameter to identify the accessible NPN networks.

There can be two options for Non-Public Network selection:

Option 1: When UE receives the broadcasted System Information Block from gNBs for providing access to the Non-public network, UE may activate the dedicated USIM application for which it has received the subscriber identifier and credentials. In order to do so, the UE will have to keep a list of the combination of PLMN ID and NPN ID and the appropriate USIM/NSIM to be activated in case there is more than one NPN. Upon reception of the broadcast, the UE will first check the PLMN ID for the indicator that indicates the non-public network (MCC 999); then the UE activates the eUICC; finally, the UE compares the NPN-IDs with the list of credentials it has in the eUICC, and picks the credentials to be used for the particular network. If there is only one credential, the UE comparison will result in a simple true/false after which the UE may decide that there is (no) credential for this NPN in the eUICC. In case that the UE finds multiple USIM/NSIMs can be associated with the combination of PLMN ID and NPN ID, then the UE performs the registration procedure by sends the registration request message with the user identity I.E. SUPI or SUCI to the Non-Public Network one by one for all identified USIM/NSIMs.

Option 2: An NPN-enabled UE has dedicated NID and associated PLMN ID that is configured in a NPN dedicated USIM application (NSIM application). For manual selection, an NPN-enabled UE can display information on available NIDs and associated PLMNs, assisting the user to activate an appropriate NPN dedicated USIM application in case there is more than one NPN subscription. Subject to user preferences, the user can perform a manual USIM application switch at any time. When an authorized NPN-enabled UE, with the dedicated NPN USIM application activated, selects an NPN, it selects the dedicated PLMN ID, attaches to the particular Non-Public network and is authenticated using security procedures as specified in TR 33.819 (NPL 9) and the security credentials from the active NPN USIM application.

Case I: When Only One USIM can be in Active Mode

FIG. 1 illustrates an operation when the USIM application 1 (for PLMN service) is activated. As shown in FIG. 1, a network system 100 includes a UE 110, a Normal BS 120, a Standalone NPN 130, and a 5G Core network 140. The UE includes a USIM application 1 and a USIM application 2. In CASE I, one of the USIM application 1 and the USIM application 2 can be activated. In FIG. 1, the USIM application 1 is activated. The 5G Core network 140 includes a UDM 141, an NPN UDM 142, and a credential store(s) (for multiple NPN IDs) 143.

In FIG. 1, the USIM application 1 (PLMN dedicated) is used to perform authentication for 'normal' network operation. The USIM application 1 contains at least:

A permanent key K1 (K)

A PLMN ID1 assigned for 'normal' network operation (PLMN ID)

IMSI1 (IMSI)

Furthermore the KT, the PLMN ID1 and the IMSI1 shall be provisioned in the UDM 141 of the 5G Core network 140 and used for authentication between the UE 110 and the network as currently specified in TS 33.501 (NPL 2).

Figure 2:
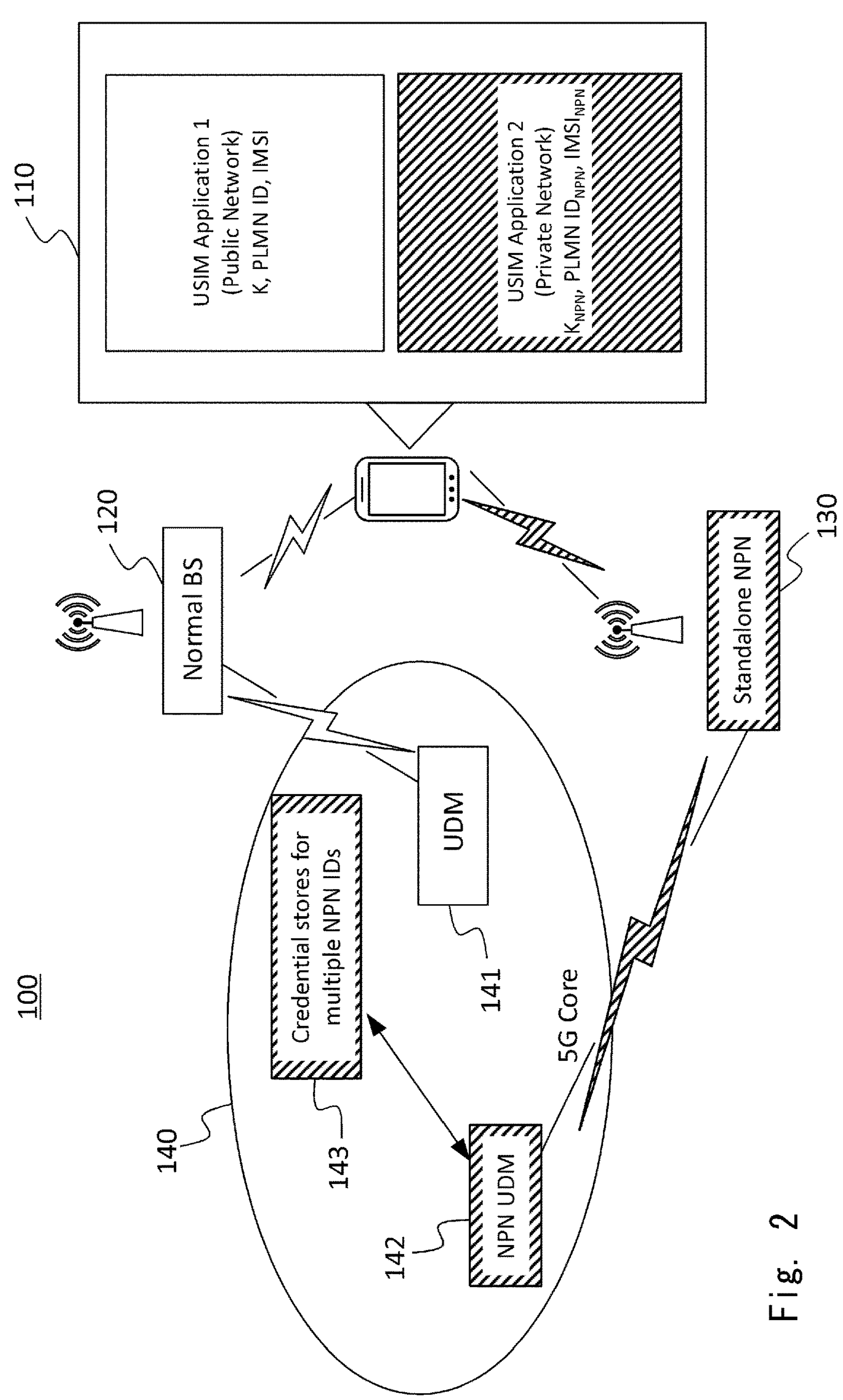
FIG. 2 illustrates an operation when another USIM application is activated according to the first aspect.

FIG. 2 illustrates an operation when the USIM application 2 (for NPN service) is activated.

In FIG. 2, the USIM application 2 (NPN dedicated) is used to perform authentication for NPN. The USIM application 2 contains at least:

A permanent key K2 ($K_{NPN}$)

A PLMN ID2 assigned for IOPS network operation (PLNM $ID_{NPN}$)

IMSI2 (IMSINPN)

Furthermore the K2, the PLMN ID2 and the IMSI2 shall be provisioned in the NPN UDM 142 or the external credential store (s) 143 (UDM cloud) for supporting NPN operation.

The USIM application 1 contains the PLMN ID for 'normal' network operation and other roaming networks. The USIM application 2 contains the dedicated NPN-specific credential.

When the UE 110 initializes and has UICC interaction the UE 110 can make a local store of all the USIM Application IDentities (AIDs) present.

For each USIM AID the UE 110 could then activate the USIM application and again locally store the PLMN identities linked to each AID.

In the event that the UE 110 attempts to attach and if the PLMN ID does not match the currently active USIM application the UE 110 can de-activate the current USIM application and then activate the other USIM application (assuming the PLMN matches the stored PLMN for the other AID).

Both the USIM application 1 and the USIM application 2 are associated with the same network operator. One UE may be subscribed to access multiple NPNs. Therefore, it is proposed to have the following options:

Option 1: 5G Core network 140 can maintain the External credential store 143 (UDM cloud) which can be used to store and maintain the multiple NPN credentials.

Option 2: Each Non-Public Network will have its own dedicated NPN UDM for the storage of the NPN related credentials.

When the UE 110 can listen both the Normal BS and the Standalone NPN in FIG. 1 and FIG. 2 at the same time, the UE local configuration may have a priority order which USIM application takes precedent over other USIM applications. Based on the priority order, the UE 110 may decide which RAN to tune to.

Case II: When Both the USIM Applications are Activated

Figure 3:
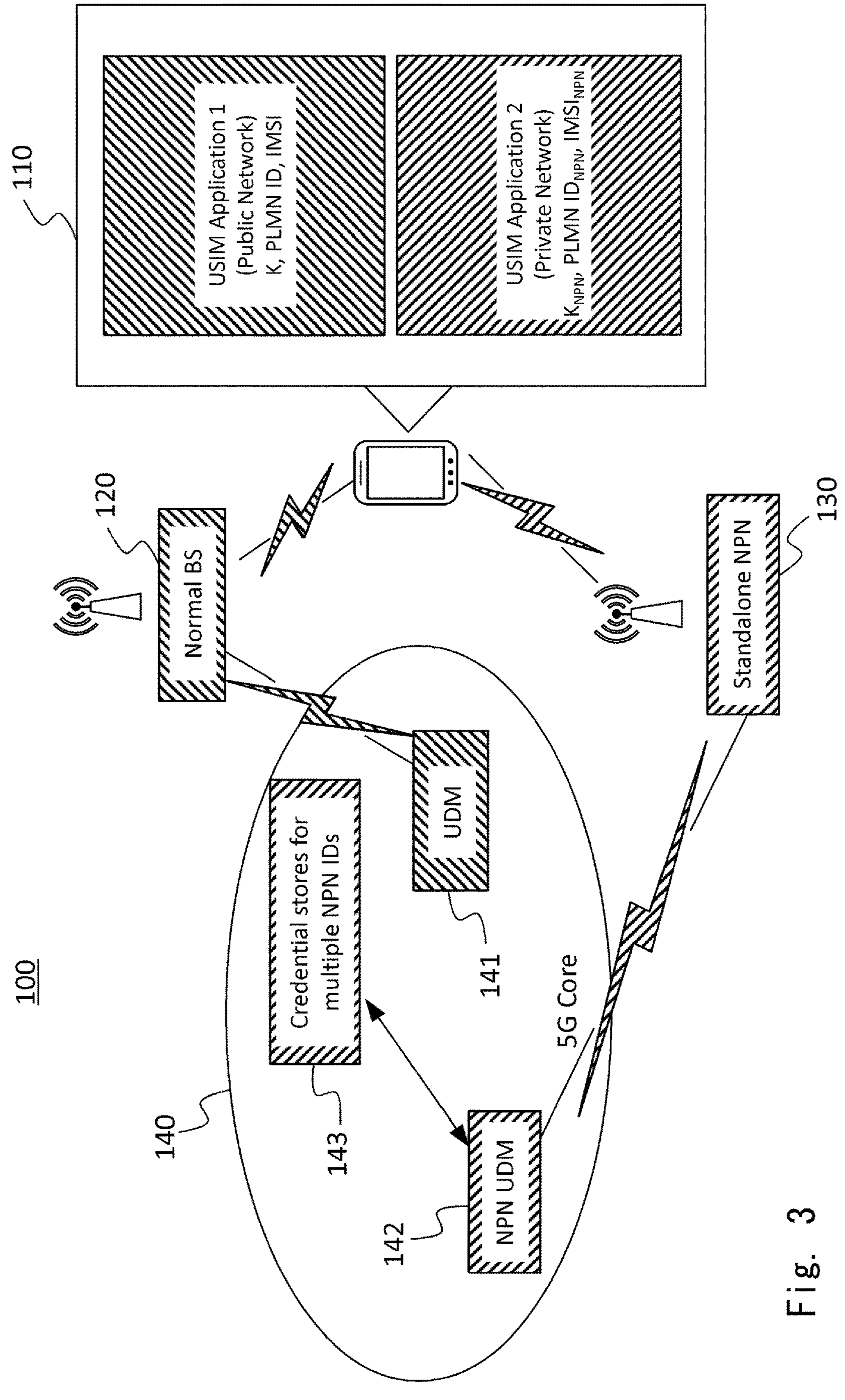
FIG. 3 illustrates an operation when both the USIM applications are activated according to the first aspect.

In CASE II, both the USIM application 1 and the USIM application 2 can be activated. FIG. 3 illustrates an operation when both the USIM applications are activated at the same time.

Normal network operation: the UE's USIM application 1 is activated for normal operation and the USIM application 2 dedicated for Non-Public Network is also activated at same time. Both the USIM applications will contain the set of security credentials configured in their respective UDM.

When the UE 110 can listen both the Normal BS 120 and the Standalone NPN 130 in FIG. 3 at the same time, the UE 110 performs the registration procedure by sends the registration request message with the user identity I.E. SUPI or SUCI to the Normal BS 120 and Non-Public Network one by one to register both the USIM application 1 and the USIM application 2 respectively. In this case, a single receiver UE 110 has a local configuration that manages a primary RAN that the UE 110 mainly tunes to. Some user application may override that local configuration. For example, when the UE 110 tunes to the Standalone NPN 130 since the USIM application 2 has higher priority than the USIM application 1, the emergency call application in the USIM application 1 can enforce the UE 110 to tune to the Normal BS 120 and proceed the Emergency call with the USIM application 1. This can be happen as the emergency call may not be supported by the Standalone NPN 130.

4.2 Second Aspect

In this aspect, it is assumed that the operator manages the credentials of both the NPN and the PLMN. It is proposed to use a similar mechanism to IOPS for this purpose so that the credential management can be eased and robustness can be achieved. One of the issues to be solved is how the UE in that case picks the appropriate home network public key for privacy purposes and how the UE selects whether to derive additional keys for NPN access.

The assumption here is that the UE has one USIM only and that this USIM contains only one credential.

The network architecture is as in FIG. 3 with case II which means that the network contains two UDMs. One is dedicated to the NPN and one is dedicated to the PLMN. The UDM in the PLMN is the main UDM, the one in the private network is the slave UDM.

The slave UDM is populated as follows:

From the main UDM, the slave UDM receives credentials for subscribers that are allowed to attach to the private network. For each subscriber the slave UDM receives an IMSI or SUPI and a secret key K'. The K' is derived from the secret key K in the main UDM by using a key separation mechanism, such as:

K'=KDF(K, NPN ID)

Where the KDF is a cryptographic hash function such as a HMAC-SHA256 and the NPN ID can be the identifier of the NPN broadcast over the air. This mechanism is known as key separation under IOPS in TS 33.501 (NPL 2).

The slave UDM can be populated with credentials on demand or can be populated in advance.

The SIDF in the slave UDM will contain its own public and private key pair. The slave UDM may send this public key to main UDM so that the USIM on the UE may be updated with this public key. The slave UDM receives the indicators to be used on the RAN so that the NPN can be identified. Such indicators include the PLMN ID, the Access Class barring, the Closed Access Group, the key separation indicator, etc.

The UE is configured as follows:

The UE has a secret key, K, and an IMSI or SUPI. It also has a list of 'equivalent PLMN IDs', which contains the PLMN ID and NID used by the private network for which this subscription is also valid. The list may also contain the 'key separation' indicator so that the UE knows that for this particular PLMN ID, key separation is applied for NPN access. The list may also contain an indicator that the network is actually an NPN or that the network has a separated storage.

The UE also has a storage of home network public key. This key is used for privacy protecting the ISMI by encrypting the IMSI/SUPI before it is sent in a registration request. The encrypted SUPI is also known as SUCI in TS 33.501 (NPL 2). In addition to the home network public key, the UE will also receive from the network a 'NPN network public key' which is to be used whenever the UE selects a network that applies 'key separation' or is indicated as an 'NPN'. In addition, the UE may store an appropriate NPN ID with the key or an equivalent PLMN ID so that the UE can retrieve the correct public key from storage whenever it receives an NPN System Information Broadcast (SIB) for which it has a subscription. Another parameter stored alongside the NPN network public key may be the Closed Access Group indicator or access class barring that is used by the public network to indicate the NPN type of access.

The credentials and public key may be stored on the USIM, eUSIM, or the ME memory.

Registration Request Procedure in this Case Works as Follows:

Suppose the UE is in a factory and receives an SIB from the private network that it has a subscription to. The SIB may contain the access class barring or CAG, and may contain the PLMN ID and NID for the specific public network. The SIB may also contain an indicator that indicates that key separation is used for this network. The UE reads the relevant information from the SIB (e.g. the PLMN ID and the Access Class).

The UE reads the public key storage and looks for a key for which the storage contains a corresponding PLMN ID or Access Class or key separation indicator that it received in the SIB. The UE looks for a corresponding element so that the correct public key can be selected.

After selection of the public key, the UE will encrypt the SUPI with the public key and includes the encrypted SUPI (SUCI) in the registration request message to the gNB.

The gNB forwards the registration request message to the slave UDM, which decrypts the SUCI to obtain the SUPI, and initiates the authentication with the UE.

It may occur that the UE does not have an appropriate public network key. In order to overcome this problem, the network should allow for flexible routing of the encrypted SUPI. In order to do so, the storage and above procedures will have to be changed as follows:

The UE stores a routing ID and associates the routing ID with each public key. Such an association may be achieved by for example storing the routing ID (or a pointer to the routing ID) together with each public key. It may also be achieved by keeping a list of routing ID, public key pairs so that every routing ID is associated with a public key and vice versa. Also, the public key identifier may be used instead of the routing ID.

Whenever the UE doesn't have a public key for the specific network even though the list of equivalent PLMN IDs may include an indicator that this network is an NPN (e.g. by using the key separation indicator or an explicit NPN indicator), the UE will use the default public key and set the routing ID to the operator's slave UDM in the registration request message.

The UE will send the registration request with the encrypted SUPI and the routing ID set to the operator's slave UDM to the gNB, which forwards it to the AMF. The AMF routes on the basis of the routing ID and sends the SUCI to the operator's AUSF/UDM instead of the local AUSF/UDM.

4.3 Third Aspect 4.3.1 NPN Credential Storage at UE/ME and Network

It is proposed to have an External credential store (UDM cloud) instance that stores the unique credentials for all the Non-Public network a UE is subscribed to. This storage repository can be reached out by the UDM to fetch the credentials for which it received the request.

This external repository may be hosted by NPN owner and NPN owner may be assigned the role of administrator for management of multiple subscription.

The admin/NPN owner may allocate users/UDM to appropriate subscription and monitor the usage of credentials by the subscribed users.

Whenever a multiple subscriber is requesting for service, the UDM shall retrieve the stored credential for authentication and authorization of UE to the Non-Public network.

Also it is proposed to have a eUICC in the UE. An embedded SIM (eUICC) can store multiple profiles, hence the NPN credentials for multiple subscription can be stored in a eUICC.

Figure 4:
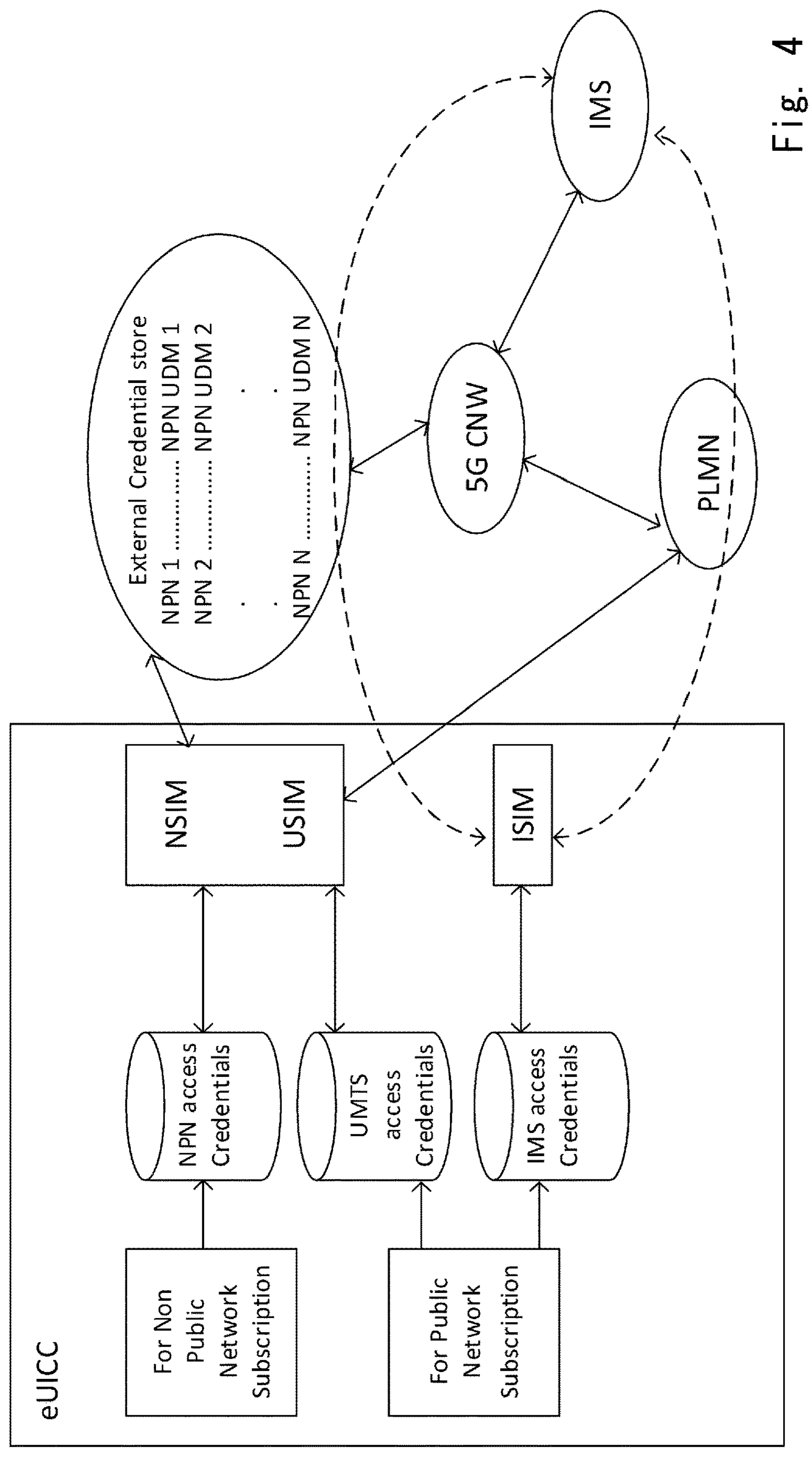
FIG. 4 illustrates a schematic configuration of eUICC with non-standalone NPN Access credentials according to a third aspect.
Figure 5:
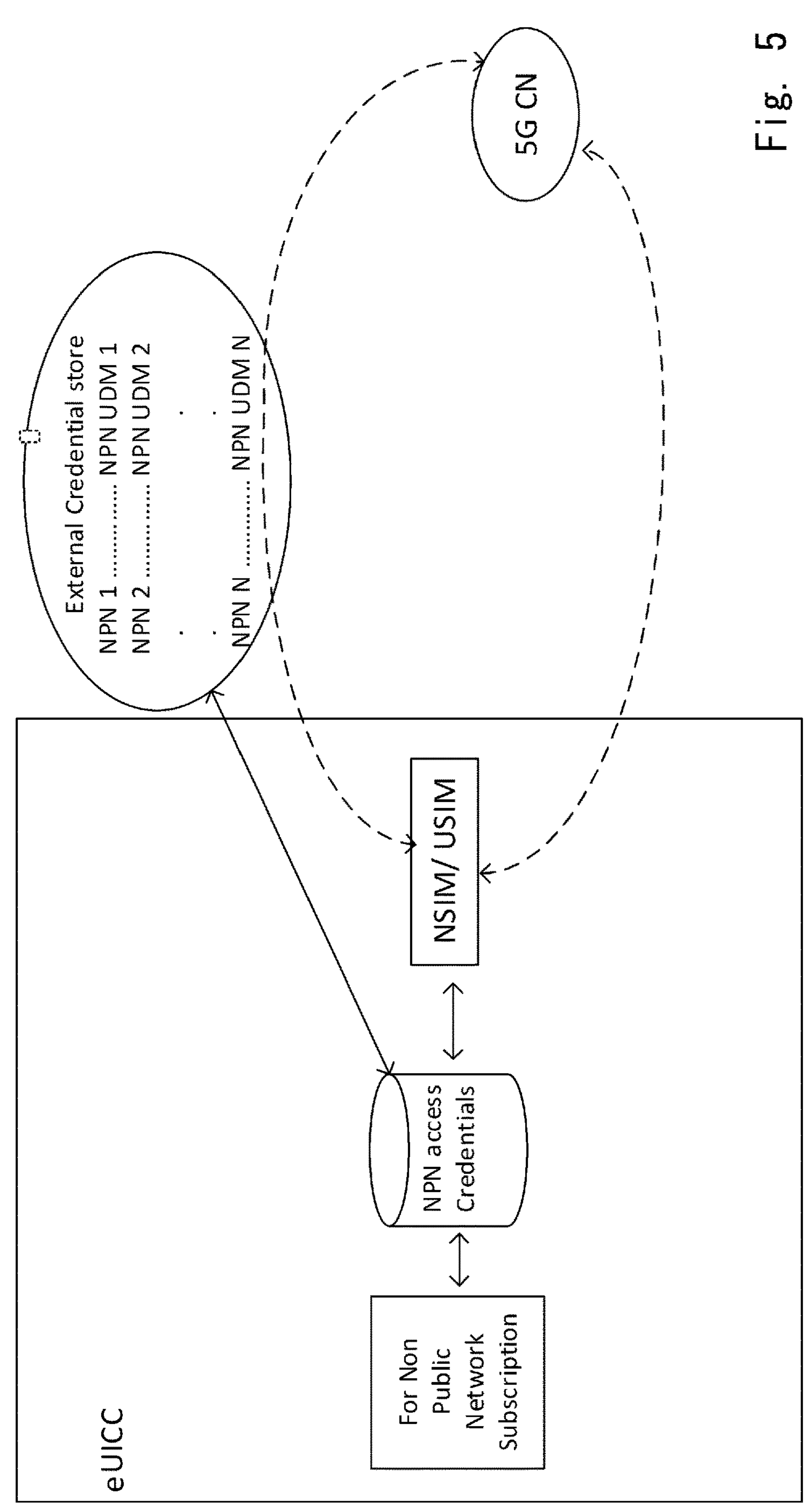
FIG. 5 illustrates a schematic configuration of eUICC with standalone NPN Access credentials according to the third aspect.

The overall eUICC architecture for non-standalone NPN access and standalone NPN access is as shown in FIG. 4 and FIG. 5 correspondingly. FIG. 4 is a schematic diagram of eUICC with non-standalone NPN Access credentials. In FIG. 4, the eUICC stores NPN access credentials for Non Public Network subscription. The eUICC contains USIM or NSIM application for Non Public Network subscription. The eUICC stores UTMS access credentials for Public Network subscription. The eUICC contains USIM or NSIM application for Public Network subscription. The eUICC stores IMS access credentials for Public Network subscription. The eUICC contains ISIM (IMS SIM) application for Public Network subscription. FIG. 5 is a schematic diagram of eUICC with standalone NPN Access credentials. In FIG. 5, the eUICC stores NPN access credentials for Non Public Network subscription. The eUICC contains NSIM or USIM application for Non Public Network subscription.

4.4 Further Aspects

User Equipment (UE)

Figure 6:
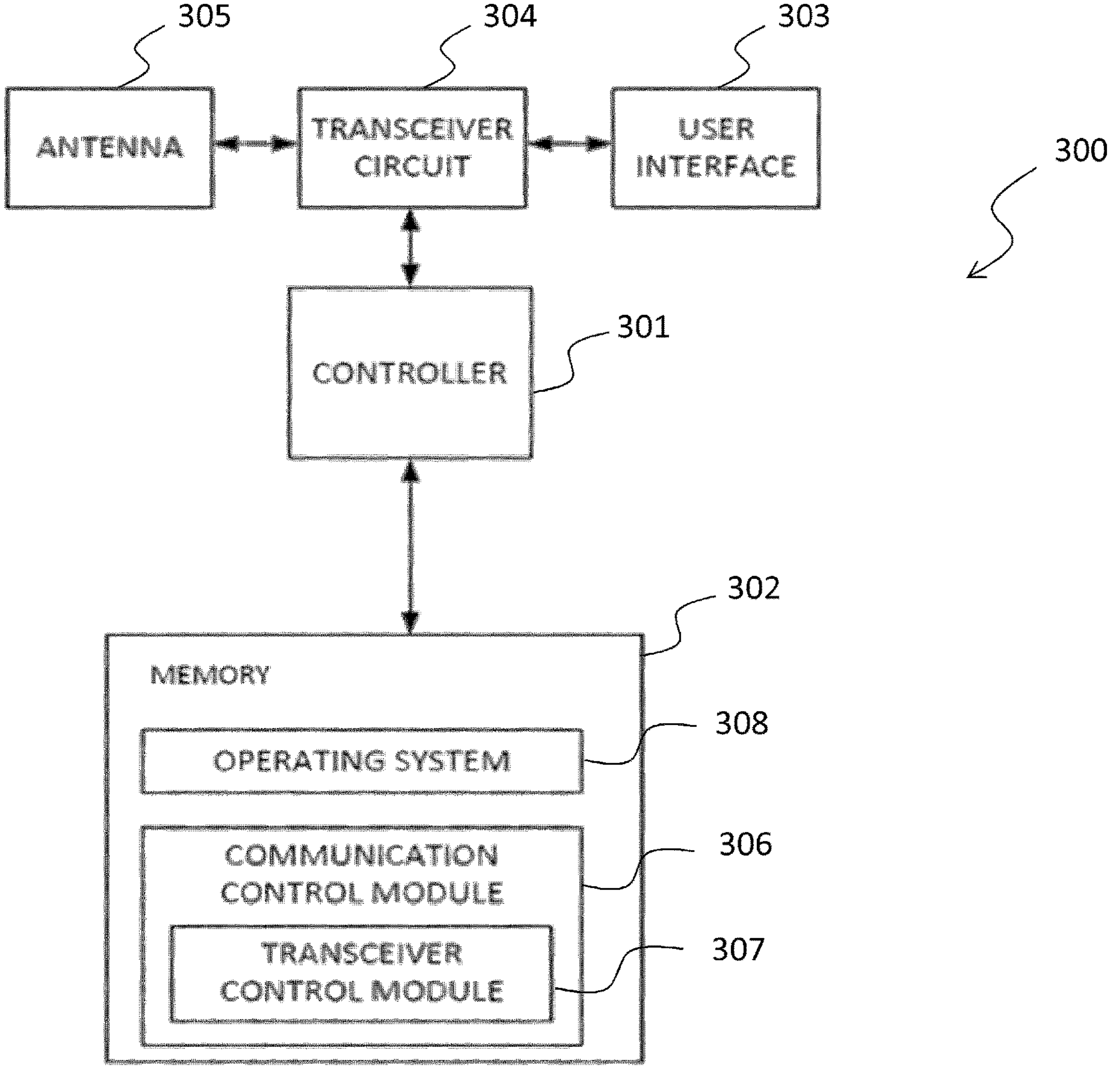
FIG. 6 illustrates a general block diagram for UE.

FIG. 6 is a block diagram illustrating the main components of the UE 300. As shown, the UE 300 includes a transceiver circuit 304 which is operable to transmit signals to and to receive signals from the connected node(s) via one or more antenna 305. Although not necessarily shown in FIG. 6, the UE 300 will of course have all the usual functionality of a conventional mobile device (such as a user interface 303) and this may be provided by any one or any combination of hardware, software and firmware, as appropriate. Software may be pre-installed in the memory 302 and/or may be downloaded via the telecommunication network or from a removable data storage device (RMD), for example.

A controller 301 controls the operation of the UE 300 in accordance with software stored in a memory 302. For example, the controller 301 may be realized by Central Processing Unit (CPU). The software includes, among other things, an operating system 308 and a communications control module 306 having at least a transceiver control module 307. The communications control module 306 (using its transceiver control sub-module) is responsible for handling (generating/sending/receiving) signalling and uplink/downlink data packets between the UE 300 and other nodes, such as the base station/(R)AN node, a MME, the AMF (and other core network nodes). Such signalling may include, for example, appropriately formatted signalling messages relating to connection establishment and maintenance (e.g. RRC messages), NAS messages such as periodic location update related messages (e.g. tracking area update, paging area updates, location area update) etc.

(R)AN Node

Figure 7:
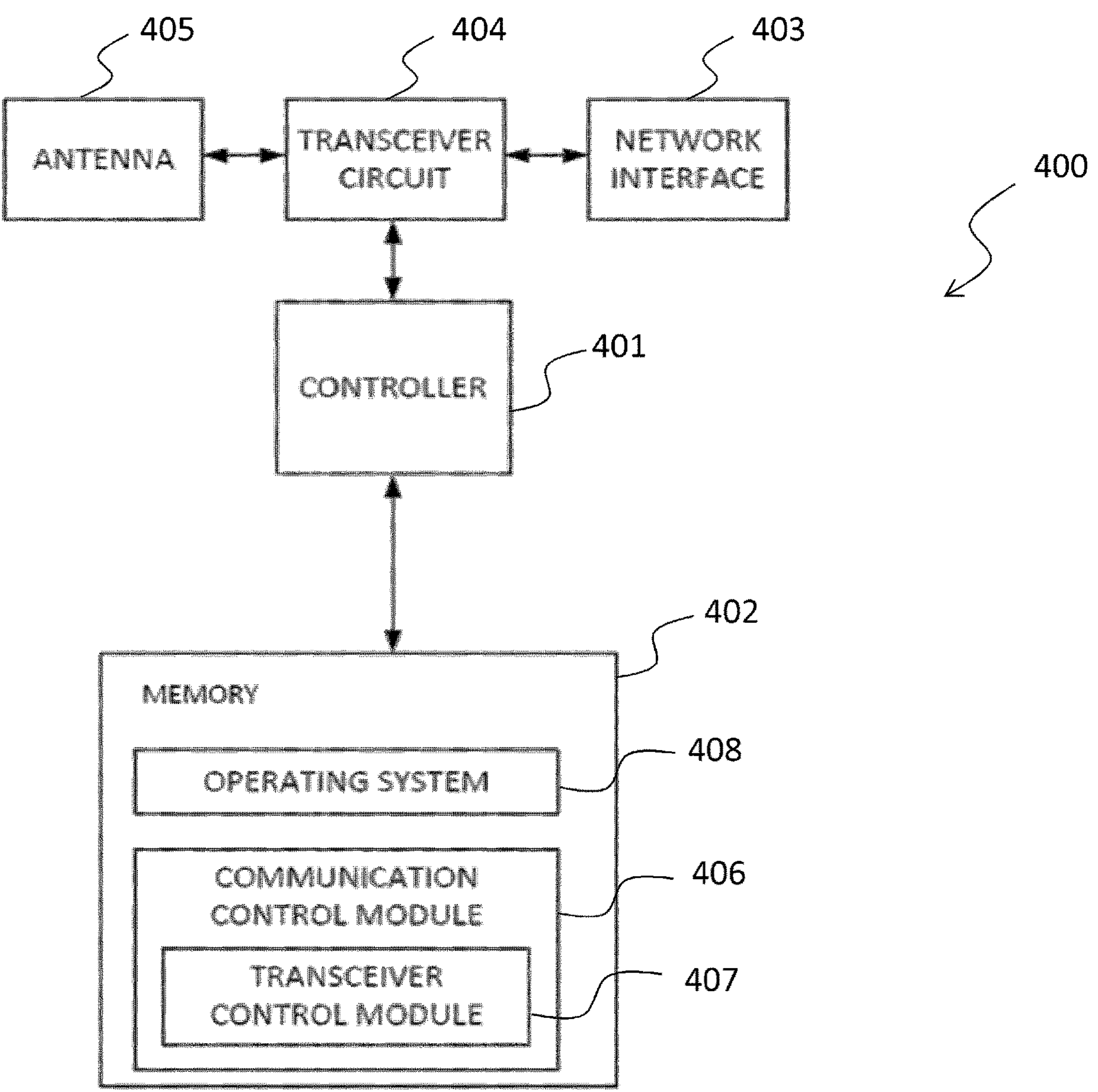
FIG. 7 illustrates a general block diagram for (R)AN.

FIG. 7 is a block diagram illustrating the main components of an exemplary (R)AN node 400, for example a base station ('eNB' in LTE, 'gNB' or 'ngNB' in 5G). As shown, the (R)AN node 400 includes a transceiver circuit 404 which is operable to transmit signals to and to receive signals from connected UE(s) via one or more antenna 405 and to transmit signals to and to receive signals from other network nodes (either directly or indirectly) via a network interface 403. A controller 401 controls the operation of the (R)AN node 400 in accordance with software stored in a memory 402. For example, the controller 401 may be realized by Central Processing Unit (CPU). Software may be pre-installed in the memory 402 and/or may be downloaded via the telecommunication network or from a removable data storage device (RMD), for example. The software includes, among other things, an operating system 408 and a communications control module 406 having at least a transceiver control module 407.

The communications control module 406 (using its transceiver control sub-module) is responsible for handling (generating/sending/receiving) signalling between the (R)AN node 400 and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller 401 is also configured (by software or hardware) to handle related tasks such as, when implemented, UE mobility estimate and/or moving trajectory estimation.

Core Network Node

Figure 8:
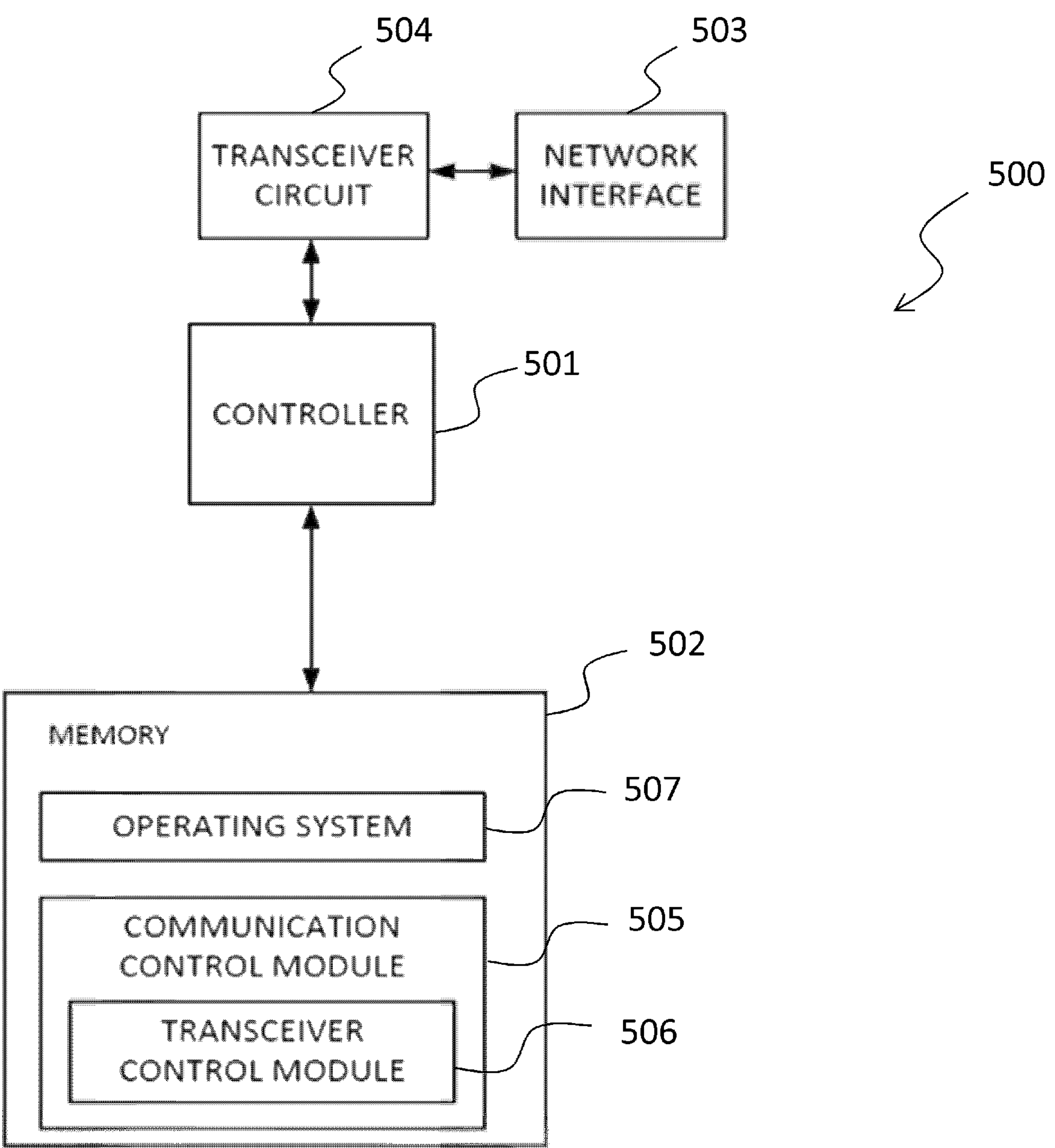
FIG. 8 illustrates a general block diagram for core network node.

FIG. 8 is a block diagram illustrating the main components of an exemplary core network node 500, for example an AMF, a SMF, a SEAF, an AUSF, an UPF, an UDM, an ARPF, SIDF, a PCF, an AF etc. The core network node is included in the 5GC. As shown, the core network node 500 includes a transceiver circuit 504 which is operable to transmit signals to and to receive signals from other nodes (including the UE) via a network interface 503. A controller 501 controls the operation of the core network node 500 in accordance with software stored in a memory 502. For example, the controller 501 may be realized by Central Processing Unit (CPU). Software may be pre-installed in the memory 502 and/or may be downloaded via the telecommunication network or from a removable data storage device (RMD), for example. The software includes, among other things, an operating system 507 and a communications control module 505 having at least a transceiver control module 506.

The communications control module 505 (using its transceiver control sub-module) is responsible for handling (generating/sending/receiving) signalling between the core network node 500 and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

The AMF provides UE-based authentication, authorization and mobility management services. It offers services to the Session Management Function. It also provides services to other AMFs, Policy Control Functions, Short Message Service Function, Location Management Function, Gateway Mobile Location Centre and NEF via the Name of service based interface. Some of the key AMF services include registration, connection, reachability and mobility management. It also serves as termination points for RAN control-plane interface (N2).

The SMF handles management of UE sessions while also allocating IP addresses to UEs. It also selects and controls the UPF for data transfer. Per-session SMFs may be allocated to UEs with multiple sessions. It also interacts with the User Plane Function for efficient routing of the user's packets.

The SEAF creates a unified anchor key KSEAF (common for all accesses) that can be used by the UE and the serving network to protect the subsequent communication for the primary authentication. It is possible that there are two anchor keys for the scenario when a UE is connected to 3GPP access (visited network) and to a non-3GPP access (home network).

The AUSF component handles authentication requests for 3GPP access and non-3GPP access networks. It interacts with the Security Anchor Function in order to authenticate the User Equipment. The set of values in the Universal Subscriber Identification Module are used by the Authentication Credential Repository and Processing Function. The subscription identifier is used to uniquely identify a subscription and to mutually authenticate the UE and the 5G core network. The AUSF serve as the termination point of user plane security, while providing the necessary authentication and authorization processes. It also handle network slicing security and Enhanced International Mobile Subscriber Identity Privacy.

The UPF supports packet routing and forwarding, packet inspection, and QoS handling. It also acts as an external PDU session point of interconnection to Data Network, and is an anchor point for intra-RAT and inter-RAT mobility. This is one of the important functions and has to efficiently process packets within sub-milliseconds. Any slowdown in this function will significantly increase packet latency and reduce user's quality-of-experience. The UPF utilizes the services of the Session Management Function.

The UDM offers services to AMF, SMF, SMSF, NEF and AUSF. The services include Subscription data storage, Context data management service Authentication service in collaboration with AUSF. The subscription data management is used by NFs (AMF and SMF) to retrieve the UE's subscription data relevant to the consumer NF from the UDM. It is also used by consumer NFs to subscribe or un-subscribe to notifications of data change. UDM offers consumer NFs (AMF, SMF, SMSF) that have previously subscribed, to get notified by means of the notification service operation when UDM decides to modify the subscribed data.

The ARPF is collocated with the UDM and stores the long term security credentials like the key K in EPS AKA or EAP-AKA for authentication. It can run cryptographic algorithms using the long-term security credentials as input and can create the authentication vectors.

The PCF governs the network behavior by supporting unified policy framework. It also provides policy rules to Control Plane function(s). For instance, it provides Access and Mobility Management related policies for the AMF; and UE policies for Access Network discovery and selection policies and UE Route Selection Policies.

The AF enables application influence on traffic routing, accessing NEF, interaction with policy framework for policy control. This function will have significant trust and security implications since the core functions are exposed to the application level.

The NEF enables external exposure capabilities of network functions for supporting Monitoring, Provisioning and Policy/Charging. The network capability exposure comprises:

(i) Exposure of network events externally as well as internally towards core network NFs; (ii) Exposure of provisioning capability towards external functions; (iii) Exposure of policy and charging capabilities towards external functions; and (iv) Exposure of core network internal capabilities for analytics.

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the following table (source: 3GPP TS 22.368 V13.1.0 (2014-12), Annex B, the contents of which are incorporated herein by reference). This list is not exhaustive and is intended to be indicative of some examples of machine type communication applications.

TABLE 1

Some examples of machine type communication applications.

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch exchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary aspects described in the present document. Needless to say, these technical ideas and aspects are not limited to the above-described UE and various modifications can be made thereto.

As will be appreciated by one of skill in the art, the present disclosure may be embodied as a method, and system. Accordingly, the present disclosure may take the form of an entirely hardware aspect, a software aspect or an aspect combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

This application is based upon and claims the benefit of priority from Indian patent applications No. 201941023422, filed on Jun. 13, 2019, the disclosure of which is incorporated herein in its entirety by reference.

The whole or part of the example embodiments disclosed above can be described as, but not limited to, the following supplementary notes.

(Supplementary Note 1)

A User Equipment (UE) comprising:
- at least one processor; and
- at least one memory operatively coupled with the at least one processor, wherein
- the at least one processor comprises:
  - a first Universal Subscriber Identity Module (USIM) application that is used to perform an authentication for a normal network operation; and
  - a second USIM application that is used to perform an authentication for a Non-Public Network (NPN), and
- the first USIM application contains a first set of security credentials stored in a first storage in a Universal Integrated Circuit Card (UICC), and
- the second USIM application contains a second set of security credentials stored in a second storage in the UICC.

(Supplementary Note 2)

The UE described in Supplementary note 1, wherein
- the first set of security credentials contains a first permanent key, a first Public Land Mobile Network (PLMN) ID assigned for the normal network operation, and a first International Mobile Subscription Identity (IMSI), and
- the second set of security credentials contains a second permanent key, a second PLMN ID assigned for an Isolated EUTRAN Operation for Public Safety (IOPS) network operation, and a second IMSI.

(Supplementary Note 3)

The UE described in Supplementary note 2, wherein
- the first set of security credentials contains a PLMN ID for other roaming network, and
- the second set of security credentials are dedicated to the NPN.

(Supplementary Note 4)

The UE described in any one of Supplementary notes 1 to 3, wherein
- the processor comprises a third storage of all USIM Application IDentities (AIDs) present, and
- the third storage includes a first AID of the first USIM application and a second AID of the second USIM application.

(Supplementary Note 5)

The UE described in Supplementary note 4, wherein the processor is configured to:
- activate the first USIM application for the first AID and store the first PLMN identity linked to the first AID; and
- activate the second USIM application for the second AID and store the second PLMN ID linked to the second AID.

(Supplementary Note 6)

The UE described in any one of Supplementary notes 2 to 5, wherein the processor is configured to:
- attempt to attach, using one of the first PLMN ID or the second PLMN ID, to a network;
- de-activate a currently active USIM application if the one of the first PLMN ID or the second PLMN ID does not match the currently active USIM application; and
- activate another USIM application corresponding to the other of the first PLMN ID and the second PLMN ID.

(Supplementary Note 7)

The UE described in any one of Supplementary notes 1 to 6, wherein the first USIM application and the second USIM application are associated with the same network, and the UE is subscribed to access multiple NPNs.

(Supplementary Note 8)

The UE described in any one of Supplementary notes 1 to 7, wherein the processor is configured to:

have a priority order which one of the first USIM application or the second USIM application takes precedent over the other of the first USIM application and the second USIM application; and decide to which one of a normal base station or a Standalone NPN base station to tune based on the priority order.

(Supplementary Note 9)

The UE described in any one of Supplementary notes 1 to 8, wherein the processor is configured to perform a registration procedure by sending a registration request message to the normal network and the NPN one by one to register both the first USIM application and the second USIM application respectively.

(Supplementary Note 10)

The UE described in Supplementary note 9, wherein the processor is configured to have a local configuration that manages a primary network to which the UE mainly tunes.

(Supplementary Note 11)

The UE described in Supplementary note 10, wherein the local configuration is overridden by a predetermined user application.

(Supplementary Note 12)

The UE described in Supplementary note 11, wherein the predetermined user application includes an emergency call application.

(Supplementary Note 13)

A network system comprising a User Equipment (UE) and a Core network, wherein the UE comprising:

at least one processor; and at least one memory operatively coupled with the at least one processor, and the at least one processor comprises:

a first Universal Subscriber Identity Module (USIM) application that is used to perform an authentication for a normal network operation; and a second USIM application that is used to perform an authentication for a Non-Public Network (NPN), and the first USIM application contains a first set of security credentials stored in a first storage in a Universal Integrated Circuit Card (UICC), and the second USIM application contains a second set of security credentials stored in a second storage in the UICC.

(Supplementary Note 14)

A method for a User Equipment (UE), the method comprising:

performing, by using a first Universal Subscriber Identity Module (USIM) application, an authentication for a normal network operation; and performing, by using a second USIM application, an authentication for a Non-Public Network (NPN), wherein the first USIM application contains a first set of security credentials stored in a first storage in a Universal Integrated Circuit Card (UICC), and the second USIM application contains a second set of security credentials stored in a second storage in the UICC.

REFERENCE SIGNS LIST

100 network system
110 UE
120 Normal BS
130 Standalone NPN
140 5G Core network
141 UDM
142 NPN UDM
143 credential store(s)
300 UE
301 controller
302 memory
303 user interface
304 transceiver circuit
305 antenna
306 communication control module
307 transceiver control module
308 operating system
400 (R)AN node
401 controller
402 memory
403 network interface
404 transceiver circuit
405 antenna
406 communications control module
407 transceiver control module
408 operating system
500 core network node
501 controller
502 memory
503 network interface
504 transceiver circuit
505 communications control module
506 transceiver control module
507 operating system

What is claimed is:

1. A User Equipment (UE) that has multiple Universal Subscriber Identity Modules (USIM)s, the UE comprising:

a memory configured to store instructions; and a processor configured to execute the instructions to:

handle multiple subscriptions for a Stand-alone Non-Public Network (SNPN);

select the SNPN based on received System Information including a Public Land Mobile Network identifier (PLMN ID) and a Network identifier (NID) for the SNPN;

send, to an Access and Mobility Management Function (AMF), a Registration Request message including a Routing Indicator, wherein the AMF routes to a Unified Data Management (UDM) associated with the SNPN based on the Routing Indicator; and access the SNPN using credentials, the credentials being owned by a credentials holder, the credentials holder being separate from both the UDM and the SNPN.

2. The UE according to claim 1, wherein the credentials holder is configured to authenticate the UE using the credentials.

3. The UE according to claim 1, wherein the UDM manages subscription data of the UE for the SNPN.

4. The UE according to claim 1, wherein the credentials holder uses the PLMN ID.

5. The UE according to claim 1, wherein the SNPN is a stand-alone 5G system deployed for non-public use.

6. A method of a User Equipment (UE) that has multiple Universal Subscriber Identity Modules (USIM)s, the method comprising:

handling multiple subscriptions for a Stand-alone Non-Public Network (SNPN);

selecting the SNPN based on received System Information including a Public Land Mobile Network identifier (PLMN ID) and a Network identifier (NID) for the SNPN;

sending, to an Access and Mobility Management Function (AMF), a Registration Request message including a Routing Indicator, wherein the AMF routes to a Unified Data Management (UDM) associated with the SNPN based on the Routing Indicator; and accessing the SNPN using credentials, the credentials being owned by a credentials holder, the credentials holder being separate from both the UDM and the SNPN.

7. The method according to claim 6, wherein the credentials holder is configured to authenticate the UE using the credentials.

8. The method according to claim 6, wherein the UDM manages subscription data of the UE for the SNPN.

9. The method according to claim 6, wherein the credentials holder uses the PLMN ID.

10. The method according to claim 6, wherein the SNPN is a stand-alone 5G system deployed for non-public use.

* * * * *